(12) United States Patent
Bruford et al.

(10) Patent No.: US 6,966,595 B2
(45) Date of Patent: Nov. 22, 2005

(54) VEHICLE TAILGATE WITH SUPPLEMENTAL TAILGATE HAVING LOCK ROD SUPPORTS

(75) Inventors: Stephen Bruford, West Bloomfield, MI (US); David Tuck, Saline, MI (US); Kian-Huat Tan, Westland, MI (US); Herbert Gruber, Rochester Hills, MI (US)

(73) Assignees: Ford Global Technologies, LLC, Dearborn, MI (US); Multimatic Inc., Markham (CA)

( * ) Notice: Subject to any disclaimer, the term of this patent is extended or adjusted under 35 U.S.C. 154(b) by 0 days.

(21) Appl. No.: 10/969,262

(22) Filed: Oct. 20, 2004

(65) Prior Publication Data

US 2005/0093325 A1    May 5, 2005

Related U.S. Application Data

(60) Provisional application No. 60/515,521, filed on Oct. 29, 2003, provisional application No. 60/515,370, filed on Oct. 29, 2003.

(51) Int. Cl.[7] ............................................. B62D 33/03
(52) U.S. Cl. .................................... 296/57.1; 296/26.1
(58) Field of Search ........................... 296/57.1, 26.08, 296/26.09, 26.1, 26.11, 26; 224/402, 403, 224/405

(56) References Cited

U.S. PATENT DOCUMENTS

| | | |
|---|---|---|
| 4,624,619 A | 11/1986 | Uher |
| 5,312,149 A | 5/1994 | Boone |
| 5,468,038 A | 11/1995 | Sauri |
| 5,478,130 A | 12/1995 | Matulin et al. |
| 5,700,047 A | 12/1997 | Leitner et al. |
| 5,788,311 A | 8/1998 | Tibbals |
| 5,806,907 A | 9/1998 | Martinus et al. |
| 5,902,000 A | 5/1999 | Wold |
| 5,988,725 A | 11/1999 | Cole |
| 6,019,410 A | 2/2000 | Trostle et al. |
| 6,045,172 A | 4/2000 | Thomas et al. |

(Continued)

FOREIGN PATENT DOCUMENTS

DE    2745751    4/1979

*Primary Examiner*—Joseph D. Pape
(74) *Attorney, Agent, or Firm*—Gigette M. Bejin; Miller Lawgroup PLLC (57) ABSTRACT

A tailgate for a vehicle with side walls and a bed has a supplemental tailgate that retracts within a tailgate frame and is extendable therefrom. The supplemental tailgate may include a guide system secured generally between the rear panel and the front panel of the tailgate frame, a movable frame assembly having two telescoping supports extendable from, pivotable relative to and retained by the guide system. The supplemental tailgate may also include a cross member connected to the two telescoping supports and extending therebetween. A lock rod assembly telescopically extends from and is pivotable relative to the cross member, with the lock rod assembly including a lock rod bar having a lock rod latch affixed thereto that is adapted to releasably latch to one of the vehicle side walls to thereby support the movable frame portion relative to the guide system when the tailgate frame is in the generally horizontal open position and the movable frame assembly is pivoted upward relative to the tailgate frame.

20 Claims, 12 Drawing Sheets

U.S. PATENT DOCUMENTS

| | | | |
|---|---|---|---|
| 6,082,801 A * | 7/2000 | Owen et al. ............. | 296/26.11 |
| 6,120,076 A | 9/2000 | Adsit et al. | |
| 6,364,392 B1 | 4/2002 | Meinke | |
| 6,425,618 B1 | 7/2002 | Garland et al. | |
| 6,454,338 B1 | 9/2002 | Glickman et al. | |
| 6,550,841 B1 * | 4/2003 | Burdon et al. ............. | 296/57.1 |
| 6,626,478 B1 | 9/2003 | Minton | |
| 6,676,182 B2 | 1/2004 | Fitts | |
| 6,698,810 B1 * | 3/2004 | Lane ............................. | 296/3 |
| 2004/0227368 A1 * | 11/2004 | Seksaria et al. ............ | 296/26.1 |

* cited by examiner

VEHICLE TAILGATE WITH SUPPLEMENTAL TAILGATE HAVING LOCK ROD SUPPORTS

CROSS REFERENCE TO RELATED APPLICATIONS

This application claims the benefit of U.S. provisional patent applications identified as application Ser. No. 60/515,521, filed Oct. 29, 2003, and application No. 60/515,370, filed Oct. 29, 2003, and are both incorporated herein by reference.

BACKGROUND OF INVENTION

The present invention relates to vehicle tailgates, and more particularly to vehicle tailgates that include a multi-function assembly extendable therefrom.

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support like a closed tailgate provides in order to prevent the load from falling backwards off the truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Another drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Thus, it is desirable to have a vehicle tailgate with a bed extender that overcomes the drawbacks of the prior art.

SUMMARY OF INVENTION

In its embodiments, the present invention contemplates a tailgate assembly for use with a motor vehicle having a pair of spaced, generally vertical side walls and a generally horizontal bed extending therebetween. The tailgate assembly has a tailgate frame, including a rear panel and a front panel, adapted to pivotally mount generally between the side walls and being operable in a generally horizontal open position. The tailgate assembly also may have a supplemental tailgate including a guide system secured generally between the rear panel and the front panel, a movable frame assembly having two telescoping supports extendable from, pivotable relative to and retained by the guide system, and a cross member connected to the two telescoping supports and extending therebetween and including a first end and an opposed second end. The supplemental tailgate also includes a lock rod assembly telescopically extendable from and pivotable relative to the first end of the cross member, with the lock rod assembly including a lock rod bar having a lock rod latch affixed thereto that is adapted to releasably latch to one of the pair of side walls to thereby support the movable frame portion relative to the guide system when the tailgate frame is in the generally horizontal open position and the movable frame assembly is pivoted upward relative to the tailgate frame.

An embodiment of the present invention also contemplates a supplemental tailgate assembly for use with a vehicle tailgate having a tailgate frame forming a generally hollow cavity therein. The supplemental tailgate assembly includes a guide system adapted to be secured generally within the hollow cavity of the tailgate, and a movable frame assembly having two telescoping supports extendable from and retained by the guide system, a cross member connected to the two telescoping supports and extending generally therebetween and including a first end and an opposed second end. The supplemental tailgate assembly may also include a lock rod assembly having a first lock rod bar that is telescopically extendible from and pivotable relative to the first end of the cross member and includes a first lock rod latch affixed thereto, and a second lock rod bar that is telescopically extendable from and pivotable relative to the second end of the cross member and includes a second lock rod latch affixed thereto.

An advantage of an embodiment of the present invention is that the supplemental tailgate is relatively simple mechanically, yet provides sturdy support for aft directed cargo loads. Moreover, the supplemental tailgate may be quickly and easily moved into a box extender position as well as retracted into the stowed position when no longer needed. This is all accomplished while minimizing potential jamming or other issues that may arise from long term use.

Another advantage of an embodiment of the present invention is that the supplemental tailgate, when in its retracted position during times of nonuse, will not detract from the attractiveness of the vehicle. Moreover, it can closely match the look of tailgates for similar trucks that do not have a supplemental tailgate, thus allowing for essentially the same appearance across that particular line of trucks. And, the use of a vehicle tailgate containing the supplemental tailgate may not generally require any modifications or additions to the vehicle itself, just the switch to a different vehicle tailgate assembly.

An additional advantage of an embodiment of the present invention is that the highly ergonomic and esthetically pleasing supplemental tailgate assembly still allows for a multi-function bed extender. This supplemental tailgate assembly may be moved to different positions in order to be employed to extend the bed, extend the box, and operate as an assist step.

DETAILED DESCRIPTION

FIGS. 1–15 illustrate a first embodiment of the present invention with a tailgate 20 that mounts to a vehicle 24—preferably a pickup truck. The tailgate 20 includes a supplemental tailgate 22 mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

The tailgate 20 may include a pair of conventional tailgate hinges 34 that cooperate with the side panels 28, 30 to allow for pivoting of the tailgate 20, and a pair of tailgate supports 36, which support the tailgate 20 when in its open, horizontal position. A tailgate handle 35 mounts to an outer panel 38 and latches 120 mount to side portions of an inner panel 40 of the tailgate 20. The latches 120 can be selectively engaged with supports (which may be conventional latch pins) 79 mounted on the side panels 28, 30, and may be disengaged by actuation of the handle 35. Since the handle and latches 120 function in a conventional manner, their operation will not be discussed further herein.

The tailgate 20 is comprised of a tailgate frame 37 including the outer panel 38, which forms the outer finished surface of the tailgate 20, and the tailgate frame inner panel 40, which mounts to the outer panel 38 and forms the inner surface and sides 42 of the tailgate 20. The outer panel 38 and inner panel 40 combine to form a pair of upper surfaces with a gap 43 therebetween. Tailgate reinforcements (not shown) may mount within and provide structural support to the frame outer and inner panels 38, 40. A left tailgate molding 50 and a right tailgate molding 52 may mount on top of the upper surfaces of the tailgate frame 37. They may be made of colored plastic (or other suitable material) that is the desired color for these parts; this eliminates the need to paint them. In this way, the tailgate moldings 50, 52 will help provide an attractive appearance while preventing paint scratches on metal parts when cargo is being loaded over the top of a closed tailgate 20.

The components that make up the tailgate frame 37 are formed so that a generally hollow internal cavity is created. Within this cavity, the supplemental tailgate 22 is retained. The supplemental tailgate 22 includes a pivotable molding 54, a movable frame portion 56, and guide rails 58. The guide rails 58 are hollow, generally rectangular tubes that are fixed to the tailgate frame 37 and support the movable frame portion 56 as it is telescopically extended from and retracted into the guide rails 58.

Each guide rail 58 includes pivot brackets 64 mounted on top of each guide rail 58 that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the tailgate frame 37 and the bottoms of the guide rails 58 may be fastened to the inner panel 40 in order to help secure the guide rails 58 to the tailgate 20.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or any other suitable means.

Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position. Each of the movable frame portion's support tubes 62 may be hollow so they can receive a respective one of the two latching assemblies 60 therein.

More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84. The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates 59 may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the supplemental tailgate 22 is in its stowed position. Each latch housing 78 also includes internal flanges 99, located within the slot 93, that engage with release ramps 100 on the latch blade 87.

Even though, for some features of the supplemental tailgate 22, only the feature on the left or right side is shown, the supplemental tailgate 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The movable frame portion 56 also includes a cross member assembly 68 that connects to the tops of the support tubes 62. The cross member assembly 68 includes a pair of post brackets 71 and lock rod brackets 67 that form a support frame 70. The cross member assembly 68 may also include a pair of hollow tubes 72 and six pivot mounts 73 mounted on the support frame 70.

The support frame 70 may be formed strong enough to support the weight of one or more people standing on it. This way, if the movable frame portion 56 is extended out and pivoted downward toward the ground, the support frame 70 can be used as a step.

The hollow tubes 72 each telescopically receive a respective one of two lock rod assemblies 74, which each have pivot hinges 75 at one end of a rod 126 and lock rod latches 76 at the far ends. The pivot hinges 75 connect each lock rod 126 to a respective sliding member 160, which are supported by the lock rod brackets 67 when the lock rod assemblies 74 are fully extended. The sliding members 160 also each connect to base portions 162, which prevent the lock rod assemblies 74 from being completely pulled out of the hollow tubes 72. Optionally, each base portion 162 may connect to a tip portion 164, which connects to a retraction spring (not shown), for assisting in retracting the lock rod assemblies 74 into the hollow tubes 72 when preparing to stow the supplemental tailgate 22.

At the other end of the lock rods 126, the lock rod latches 76 may be formed from a single cast piece, formed from two stamped halves that are secured together, or formed by some other suitable means. The material from which they are formed may be stainless steel, some other suitable corrosion resistant material, or some other suitable material with a corrosion resistant coating thereon. The lock rod latches 76 may be secured to the hollow tubes 72 by welding, fasteners, or some other suitable means.

The lock rod latches 76 are selectively connectable to the hook supports 79. Each lock rod latch 76 includes a release lever assembly 131 mounted thereto that, when actuated, allows the lock rod latch 76 to slide onto its hook support 79, and, when released, secures that lock rod latch 76 on the hook support 79.

The pivot hinges 75 allow the lock rod assemblies 74 to be extended toward the truck so that the lock rod latches 76 can hook to supports 79 on the truck box 26 in order to allow the movable frame portion 56 to be held in its upright position, thus creating a box extender. The supports 79 are preferably just the conventional pin strikers used to hold the tailgate in its closed position. This way, the same supports can be employed on the vehicle, whether using a conventional tailgate or the tailgate 20 of this invention.

The pivot mounts 73 connect to and mount the pivotable molding 54 about a pivot axis 77. The pivotable molding 54 may be formed from plastic, or other suitable material such as, for example, a thirty percent glass filled polypropylene. The release levers 82 may be molded into the pivotable molding 54 as it is being formed or affixed thereto after forming by, for example, friction welding. Each release lever 82 includes a pivot flange 88 and a spaced release flange 90 extending therefrom. Each pivot flange 88 pivotally mounts about one of the pivot mounts 73. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latch actuation rods 80, in turn, pull up on the latch housings 78, which causes the latching assemblies 60 unlatch. This allows the support tubes 62 to slide relative to the guide rails 58 when the latch actuation rods 80 are pulled upwards and re-engage when the latch actuation rods 80 are released.

The pivotable molding 54 may be molded with the plastic being the desired final color so that it does not have to be painted. The pivotable molding 54 also may include a handle pocket 94 that is molded into the rear surface of the pivotable molding 54. The handle pocket 94 provides for ease of gripping and pivoting the pivotable molding 54 when deploying the supplemental tailgate 22. The pivotable molding 54 may have an overall width that is just smaller than the gap 43 formed between the two tailgate moldings 50, 52, and has a top surface that is flush with the top surfaces of the two tailgate moldings 50, 52. In this way, the supplemental tailgate 22, when in its fully retracted position, will blend-in with the tailgate 20, having an appearance that is very similar to a tailgate that does not include a supplemental tailgate. Alternatively, the two tailgate moldings 50, 52 may each include tabs (only shown in the second embodiment below) that are recessed under the edges of the pivotable molding 54, which will rest on top, with the tabs recessed sufficiently to allow the top surfaces to be flush with each other. Thus, the supplemental tailgate 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns.

The operation of the supplemental tailgate 22 will now be described. The supplemental tailgate 22 may be easily released from its stowed position within the tailgate 20 while the tailgate 20 is in its open or closed position. Although, for the most advantageous use of the supplemental tailgate functions, the tailgate 20 will be in its horizontal open position. Optionally, if so desired, an extra latching mechanism (not shown) may be employed that will only allow release of the supplemental tailgate 22 when the tailgate 20 is in its horizontal position.

To deploy the supplemental tailgate 20 from its stowed position, one grasps the pivotable molding 54 and pivots it relative to the pivot axis 77. This will cause the release flanges 90 to pull up on the latch actuation rods 80, which, in turn, will pull up on the latch housings 78 against the bias of the latch return spring 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

One then pulls on the supplemental tailgate 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at these extended positions, the support tubes 62 still remain partially within the guide rails 58 so that the two will not pivot relative to one another. With the tailgate 20 in its horizontal open position, the supplemental tailgate 22 is now in its bed extender position, (see FIG. 6). While only a limited number of bed extender positions are discussed herein, the supplemental tailgate 22 may have additional bed extender positions by providing additional engagement slots, if so desired.

The pivotable molding 54 may then be pivoted again to release the latching assemblies 60 once more. One may then pull the supplemental tailgate 22 out to its fully extended position relative to the open tailgate 20. In this fully extended position, the support tubes 62 will be pulled out of the guide rails 58, with the hinge pins 66 engaged in the slots 65 of the pivot brackets 64.

The movable frame portion 56, from its fully extended position, can be pivoted upward into an upward extending vertical position, to serve as a box extender. The lock rod assemblies 74 are pulled out of their respective hollow tubes 72 until each pivot hinge 75 is exposed, with the base portions 162 preventing the rods 126 from being pulled completely out. Each lock rod 126 is then rotated toward the back end of the vehicle 24 until the lock rod latches 76 are located just above the hook supports 79, (best seen in FIG. 13A). For each side, the operator then pushes in on the release lever assembly 131 and lowers the lock rod latch 76 onto the hook support 79, (best seen in FIG. 13C). The operator releases the release lever assembly 131, thus securing the lock rod 126 in place, (best seen in FIGS. 9 and 13B). The supplemental tailgate 22 is now secured in its upright, box extender position. The support tubes 62 and cross member assembly 68 will support cargo with aft applied loads, and the lock rod assemblies 74 will support cargo with side applied loads.

Performing the deployment operation generally in reverse will allow one to easily stow and latch the supplemental tailgate 22 back into the tailgate 20. Hence, an easy to operate and ergonomic supplemental tailgate 22 is provided for the vehicle 24. Moreover, while generally no modifications to the vehicle itself may be required, in which case a standard vehicle can accept either a conventional tailgate or the tailgate 20 with the supplemental tailgate 22, one may, if so desired, increase the strength of the structure toward the rear of the box 26 in order to better support the tailgate 20 of the present invention.

Figure 1:
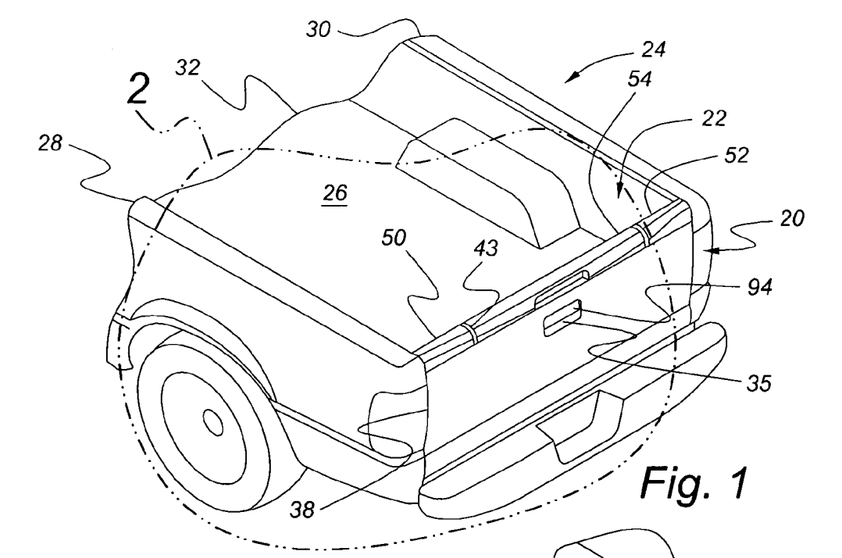
FIG. 1 is a perspective view of a rear portion of a vehicle incorporating a tailgate, with the tailgate shown in a generally vertical, closed position, in accordance with the present invention.
Figure 2:
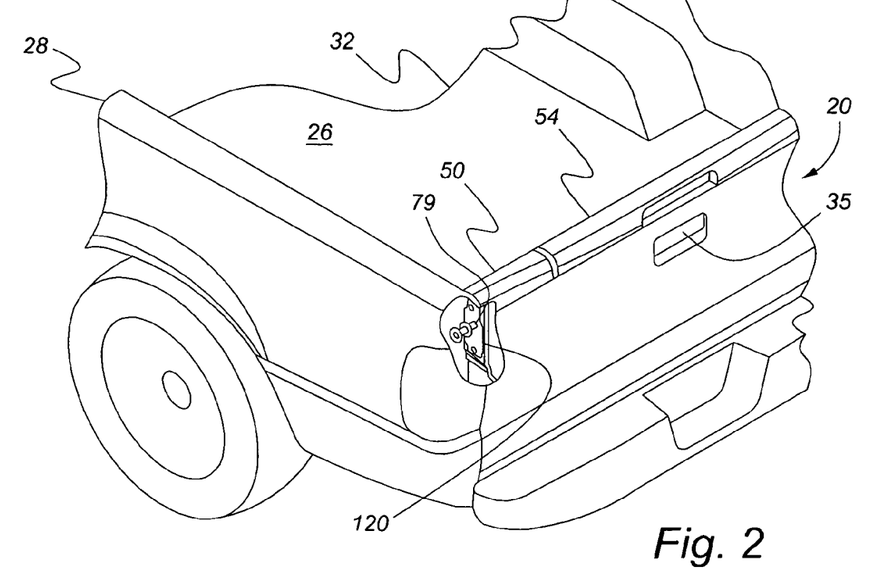
FIG. 2 is a rear perspective view, on an enlarged scale, of encircled area 2 in FIG. 1.
Figure 3:
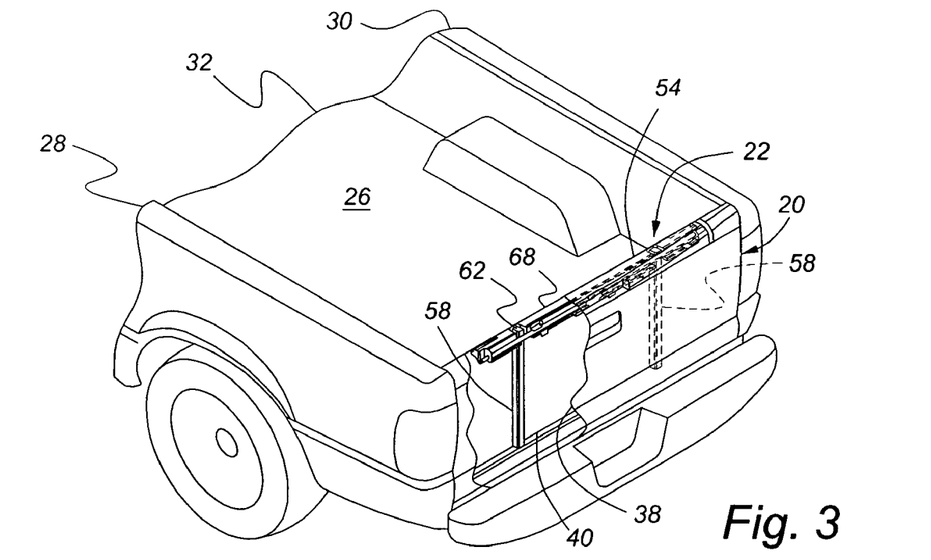
FIG. 3 is a partially cutaway perspective view similar to FIG. 2, with the cutaway area revealing the supplemental tailgate structure retracted into its stowed position within the vehicle tailgate.
Figure 4:
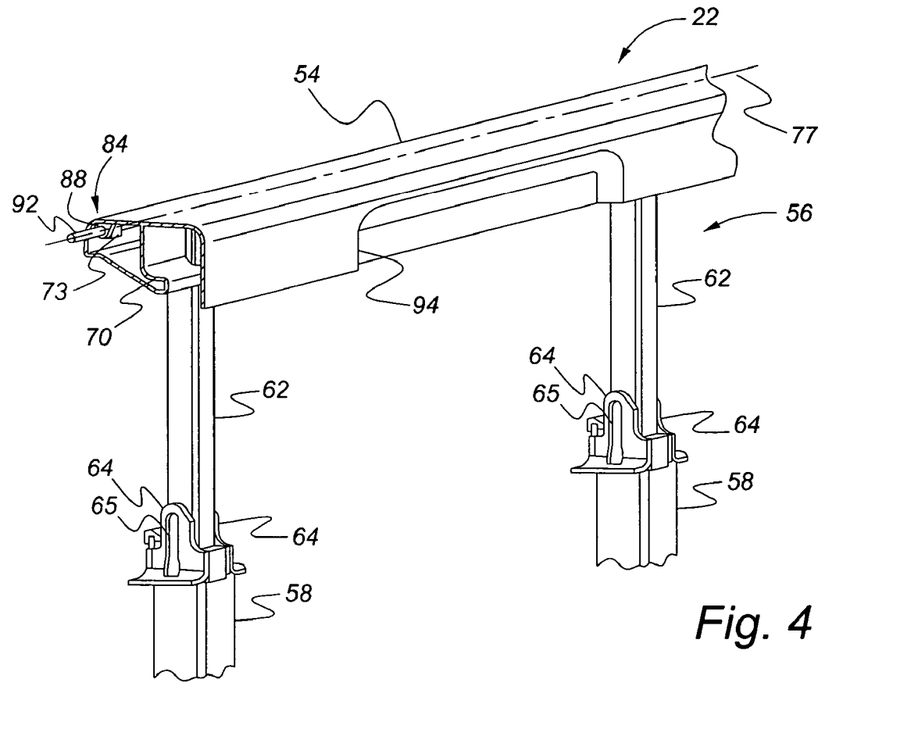
FIG. 4 is a rear perspective, partially sectioned view of the supplemental tailgate in accordance with the present invention.
Figure 5:
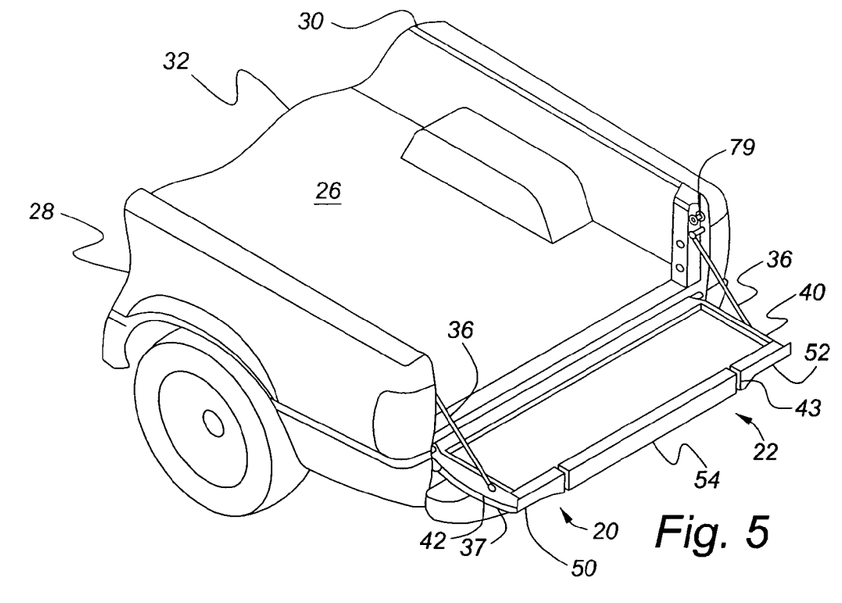
FIG. 5 is a partial perspective view similar to FIG. 1, but with the tailgate shown in its open, generally horizontal position.
Figure 6:
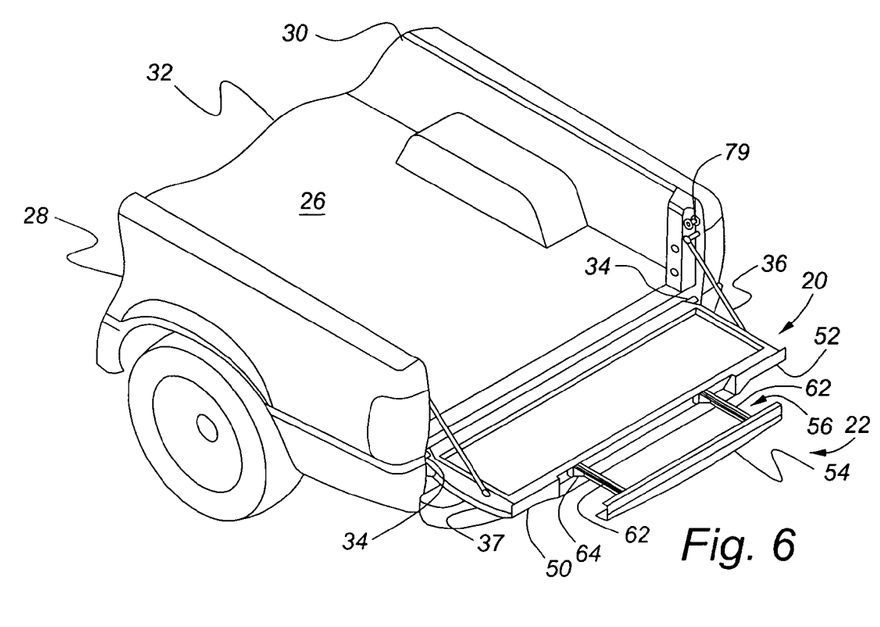
FIG. 6 is a partial perspective view similar to FIG. 5, but with the supplemental tailgate shown in a partially extended position, and with the vehicle tailgate in its open, generally horizontal position.
Figure 7:
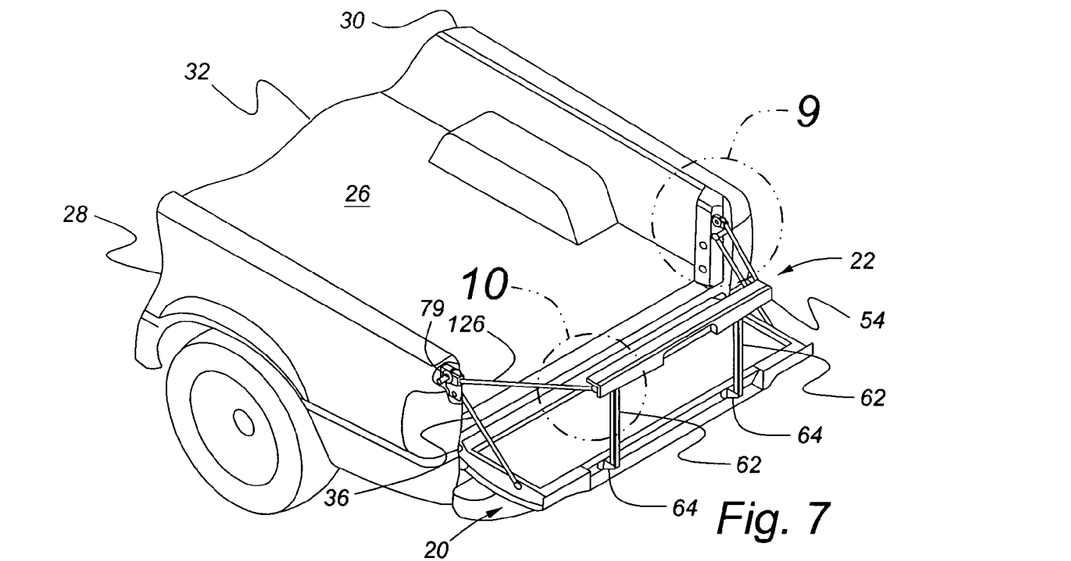
FIG. 7 is a partial perspective view similar to FIG. 5, but with the supplemental tailgate shown in a fully extended, upwardly rotated position, and with the vehicle tailgate in its open, generally horizontal position.
Figure 8:
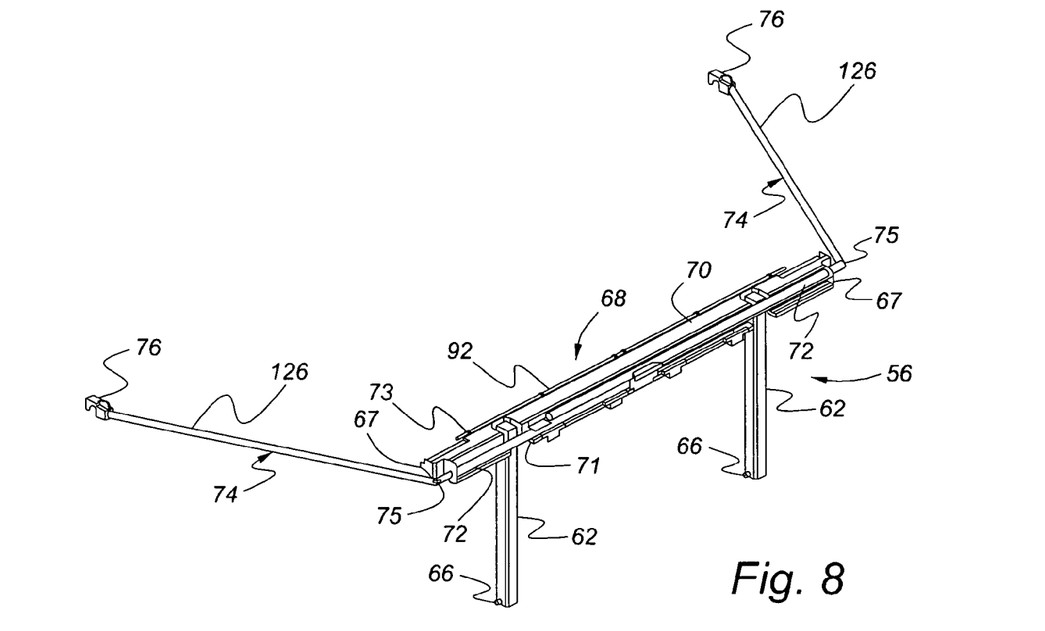
FIG. 8 is a rear perspective view of a movable frame portion of the supplemental tailgate, but without the pivotable molding illustrated, in accordance with the present invention.
Figure 9:
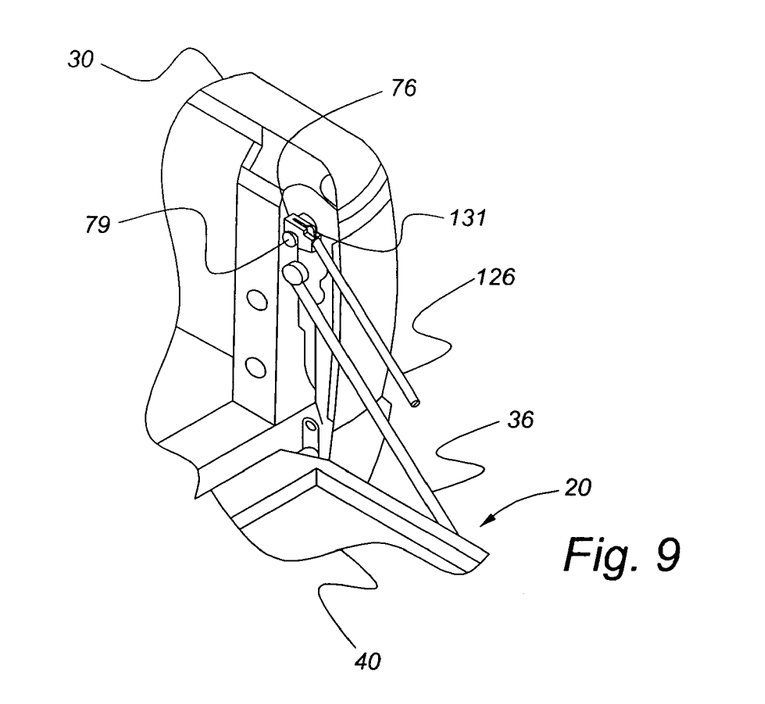
FIG. 9 is a perspective view, on an enlarged scale, illustrating encircled area 9 in FIG. 7.
Figure 10:
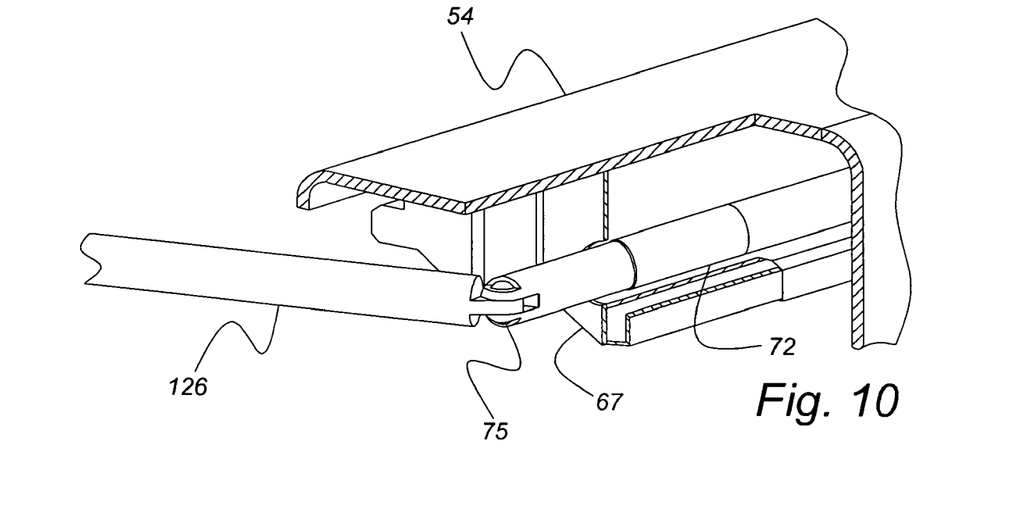
FIG. 10 is a perspective, partially cutaway view, on an enlarged scale, illustrating encircled area 10 in FIG. 7.
Figure 11:
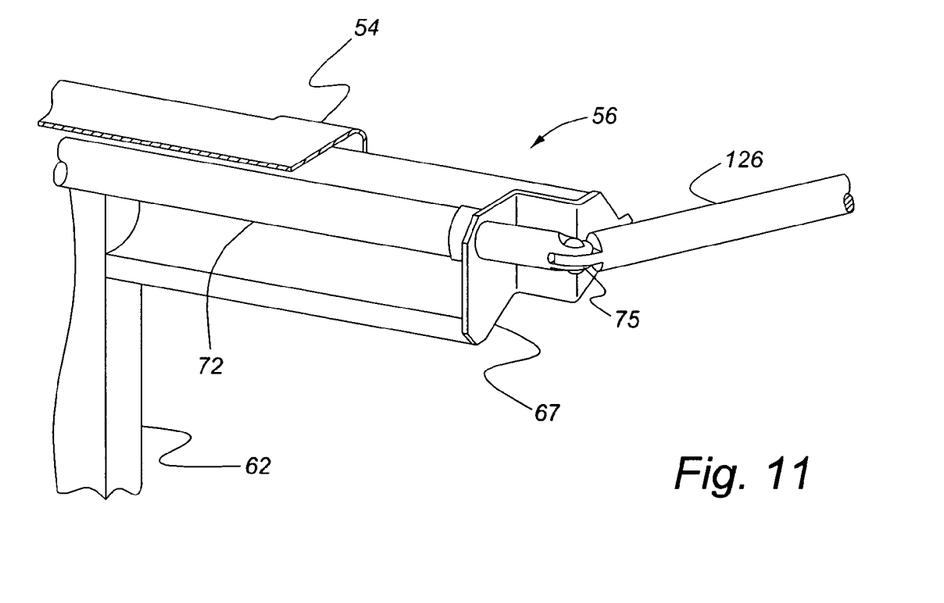
FIG. 11 is a perspective, partially cutaway view of the movable frame portion of the supplemental tailgate in accordance with the present invention.
Figure 12:
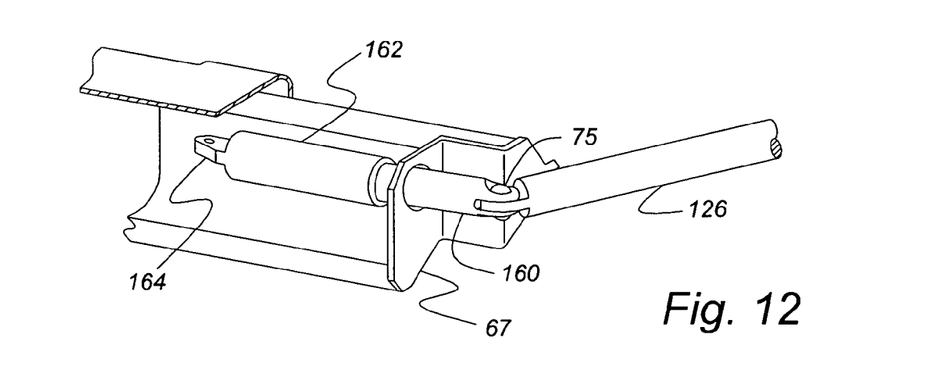
FIG. 12 is a view, on an enlarged scale, similar to FIG. 11, but without the hollow tube illustrated.
Figure 13A:
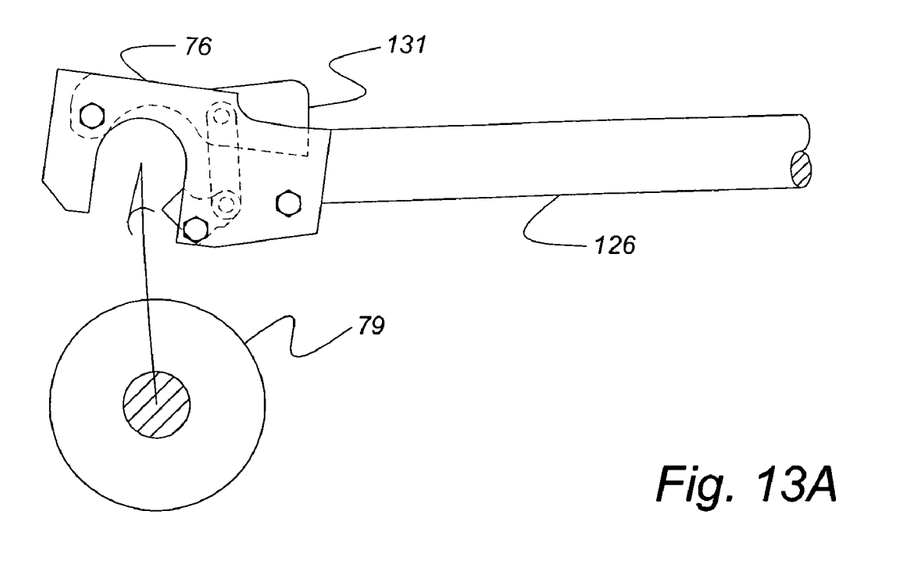
FIG. 13A is a side, partially sectional view of a lock rod latch prior to engagement with a hook support, in accordance with the present invention.
Figure 13B:
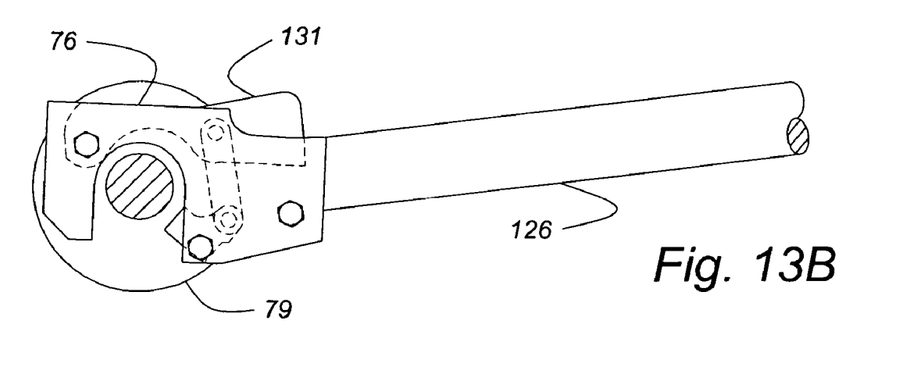
FIG. 13B is a view similar to FIG. 13A, but with the lock rod latch in a locked position on the hook support.
Figure 13C:
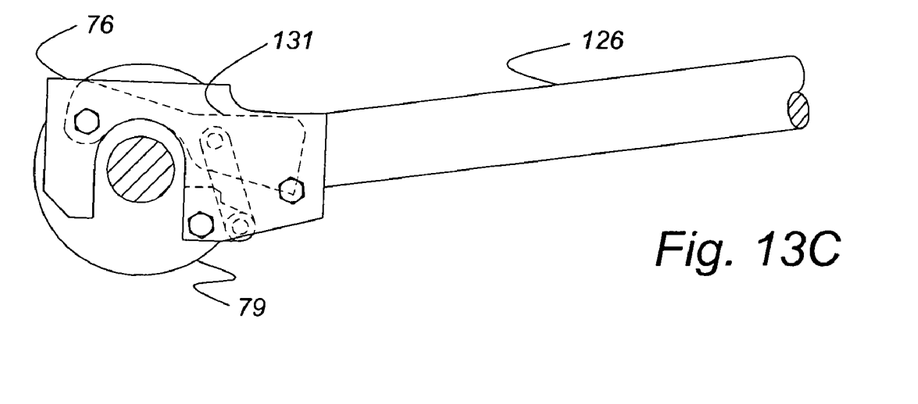
FIG. 13C is a view similar to FIG. 13A, but with the lock rod latch in an unlocked position on the hook support.
Figure 14:
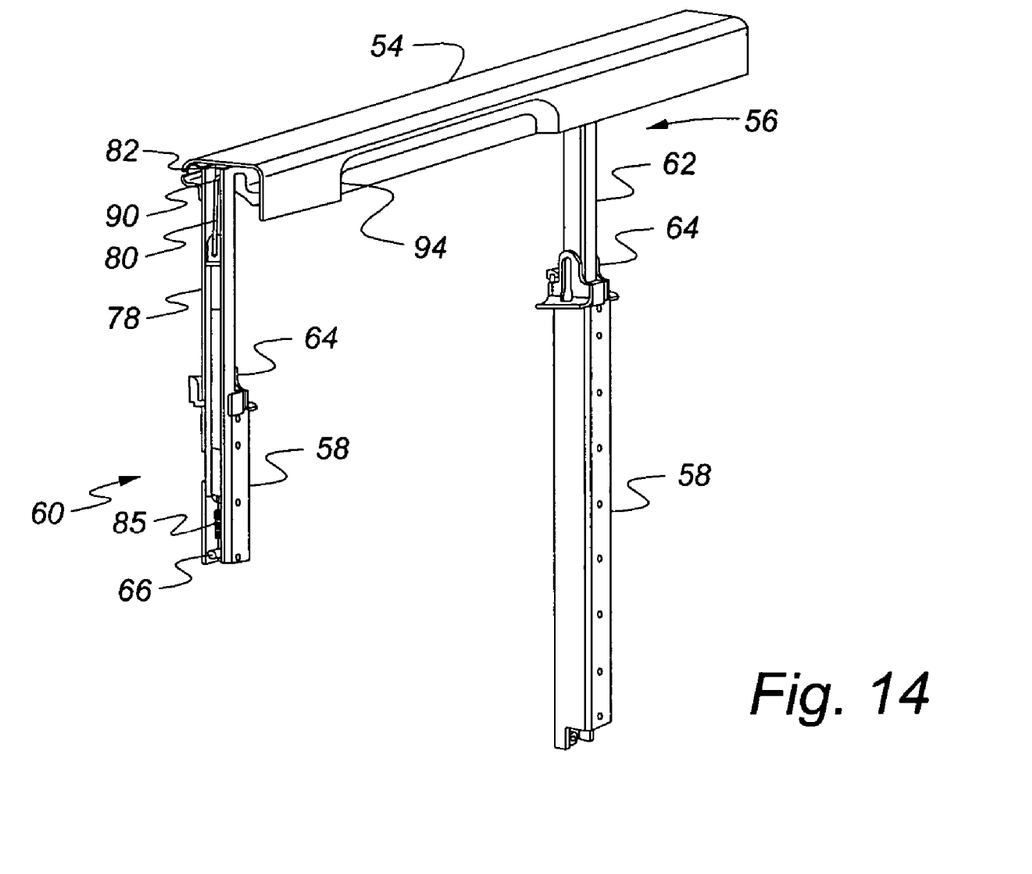
FIG. 14 illustrates a rear perspective, partially sectioned view similar to FIG. 4, but with the section cut taken at a different location.
Figure 15:
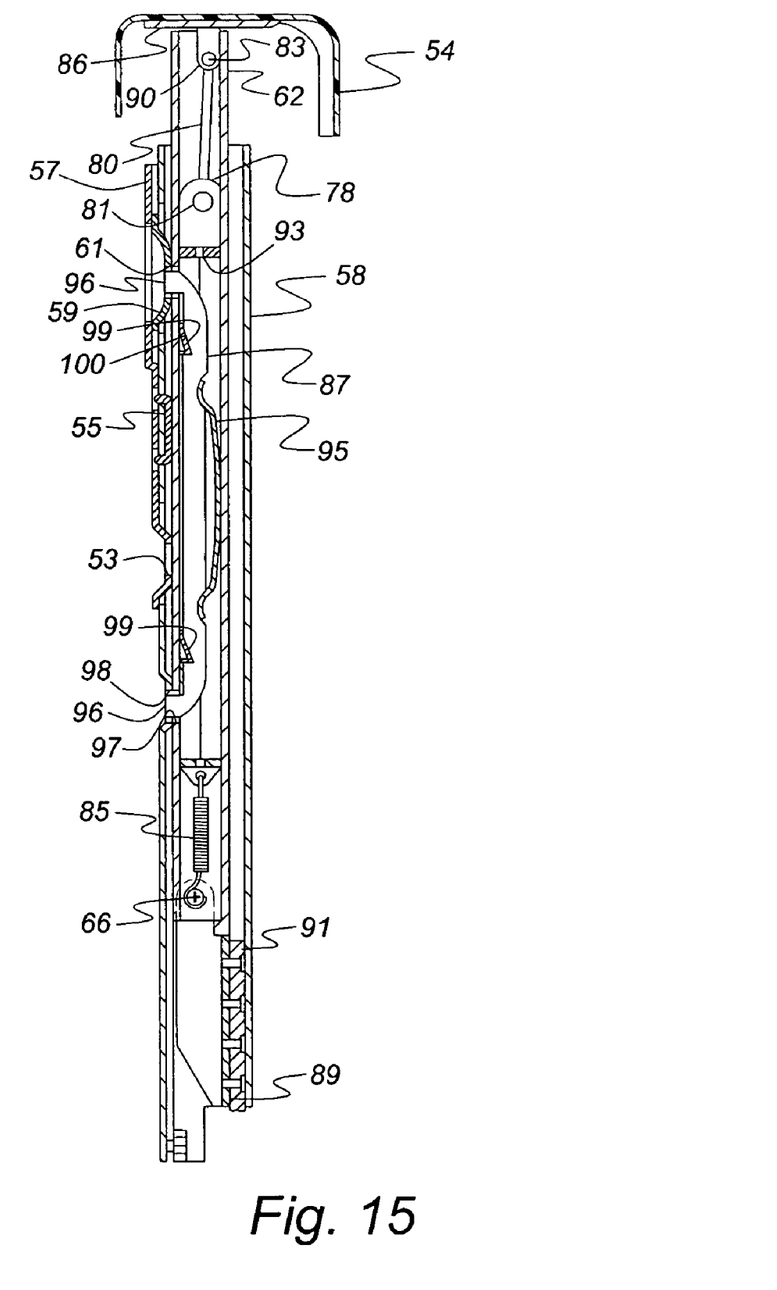
FIG. 15 is a side sectional view of the supplemental tailgate in accordance with the present invention.
Figure 16:
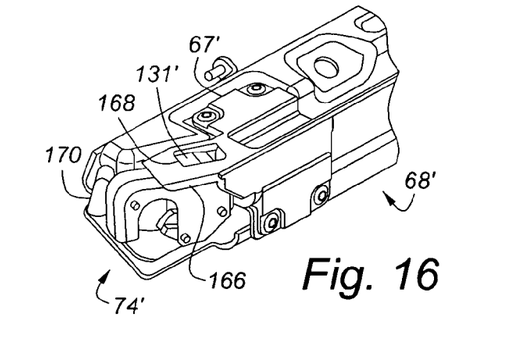
FIG. 16 is a perspective view of a portion of the supplemental tailgate, with a lock rod assembly in its stowed position and without the pivotable molding shown, in accordance with a second embodiment of the present invention.
Figure 17:
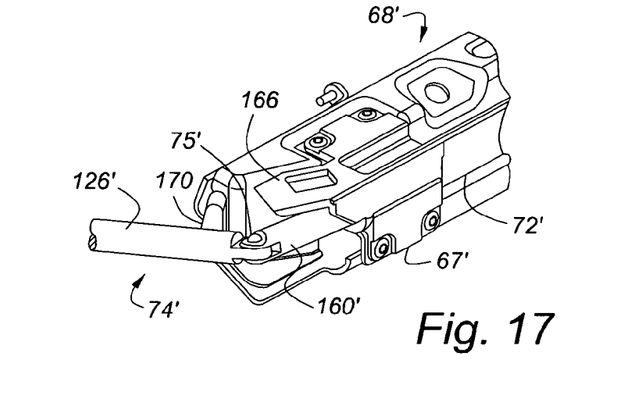
FIG. 17 is a perspective view similar to FIG. 16 but illustrating the lock rod assembly in its extended position.
Figure 18:
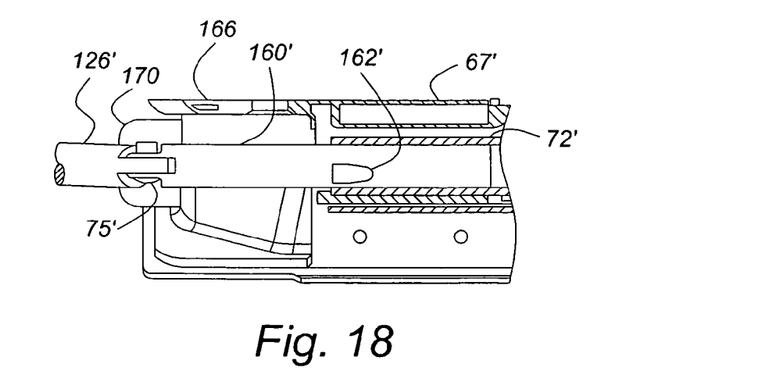
FIG. 18 is partially cutaway, front view of a portion of the supplemental tailgate in accordance with the second embodiment of the present invention.
Figure 19:
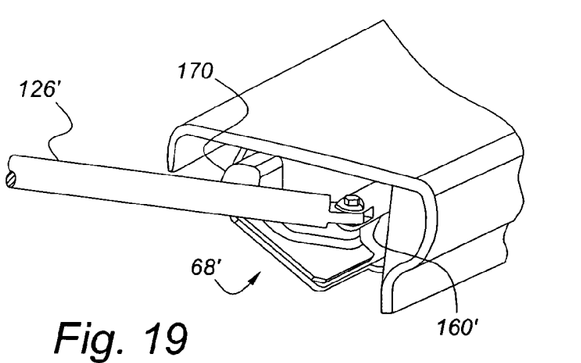
FIG. 19 is perspective view similar to FIG. 17 but also including the pivotable molding.
Figure 20:
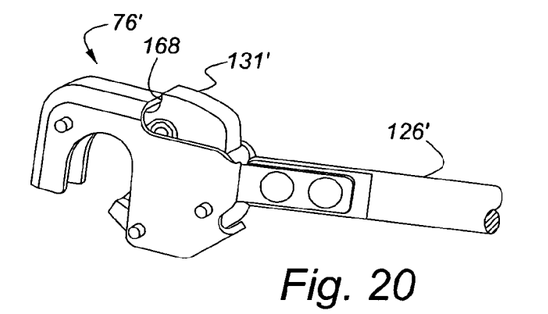
FIG. 20 is a partial, perspective view of a lock rod latch according to the second embodiment of the present invention.
Figure 21:
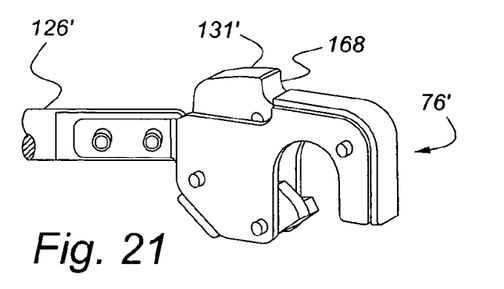
FIG. 21 is a view similar to FIG. 20, but viewing the lock rod latch from its opposite side.
Figure 22:
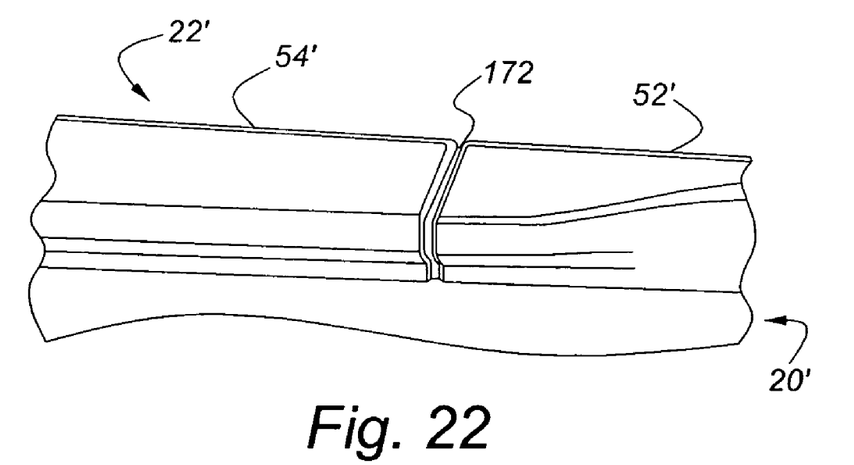
FIG. 22 is a perspective view of a portion of the tailgate according to the second embodiment of the present invention.
Figure 23:
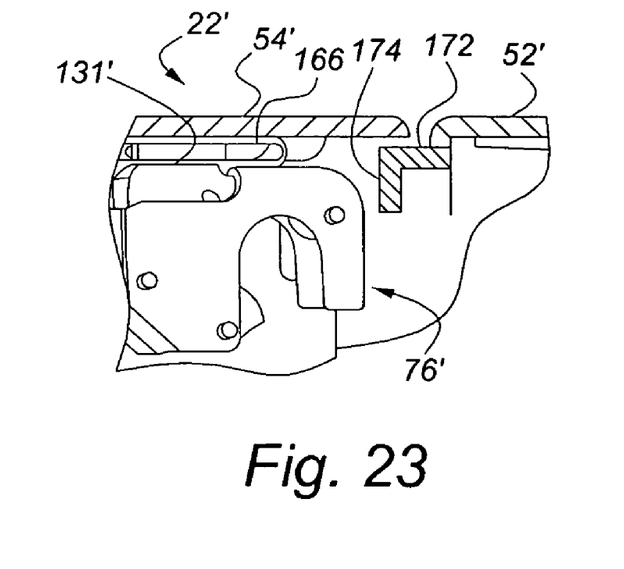
FIG. 23 is a partial cutaway front view of the portion of the tailgate illustrated in FIG. 22.

FIGS. 16–23 illustrate a second embodiment of the present invention. In this embodiment, the mounting of the pivoting ends of the lock rods have been modified, as best seen in FIGS. 16–19, the lock rod latches have been modified, as best seen in FIGS. 20 and 21, and the interaction of the lock rods, when stowed, with the tailgate moldings has been modified, as best seen in FIGS. 22 and 23. Referring to FIGS. 16–21, the cross member assembly 68' employs more substantial lock rod brackets 67' that may provide improved support of the lock rod assemblies 74' when they are in their extended positions. The lock rod brackets 67' may include lock rod release levers 166, which engage with corresponding lock rod catches 168 on the release levers 131 in order to hold the lock rod assemblies 74 in their fully stowed positions (as seen in FIG. 16). With these catches 168, the lock rod assemblies 74' are positively retained in order to ensure that they remain fully stowed—thus avoiding any interference concerns—when retracting the supplemental tailgate into its stowed position. Also, these catches 168 may minimize the potential for the lock rod assemblies 74' to slide out of their fully stowed positions during vehicle cornering.

During deployment, the lock rod catches 168 may be depressed to release them from the lock rod release levers 166, allowing the lock rod assemblies 74' to be pulled from their respective hollow tubes 72'. The lock rods 126' and sliding members 160' are pulled from the hollow tubes 72' until stop tabs 162' (only seen in FIG. 18), extending from the sliding members 160', engage with the lock rod brackets 67'. The stop tabs 162' prevent the lock rod assemblies 74' from being pulled completely out of the cross member assembly 68'. As the lock rods 126' are pivoted about their respective pivot hinges 75' toward their deployed positions, the lock rods 126' may press against lock rod bumpers 170, which may be formed from an elastomeric material. The bumpers 170 may assist in minimizing side-to-side chucking that may occur when the vehicle box undergoes twisting loads during vehicle operation.

Referring to FIGS. 20 and 21, the lock rod latches 76' may be formed from two main housing parts, which may be formed by stamping, attached together after assembly of the release lever 131' therein. Also, the lock rod latches 76' may be riveted or fastened to the lock rods 126' rather than being attached by welding.

Referring to FIGS. 22 and 23, the pivotable molding 54' still mounts between the tailgate moldings 50, 52 (only the right tailgate molding shown), but each of the tailgate moldings 50, 52 may include a side molding flange 172 that nests underneath the corresponding edge of the pivotable molding 54'. A lock rod stowage tab 174 may extend from each side molding flange 172 enough that, when the supplemental tailgate 22' is in its stowed position, the corresponding lock rod latch 76' will abut the lock rod stowage tab 174 should the release lever 131' come loose from its lock rod release lever 166. The lock rod stowage tabs 174, then, may prevent the lock rod latches 76' from moving while the supplemental tailgate 22' is stowed and interfering with the ability to open the supplemental tailgate 22'.

While certain example embodiments of the present invention have been described in detail, those familiar with the art to which this invention relates will recognize various alternative designs and embodiments for practicing the invention as defined by the following claims.

What is claimed is:

1. A tailgate assembly for use with a motor vehicle having a pair of spaced, generally vertical side walls and a generally horizontal bed extending therebetween, the tailgate assembly comprising:
   a tailgate frame, including a rear panel and a front panel, and adapted to pivotally mount generally between the side walls and being operable in a generally horizontal open position; and
   a supplemental tailgate including a guide system secured generally between the rear panel and the front panel, a movable frame assembly having two telescoping supports extendable from, pivotable relative to and retained by the guide system, a cross member connected to the two telescoping supports and extending generally therebetween and including a first end and an opposed second end, and a lock rod assembly telescopically extendable from and pivotable relative to the first end of the cross member, with the lock rod assembly including a lock rod bar having a lock rod latch affixed thereto that is adapted to releasably latch to one of the pair of side walls to thereby support the movable frame portion relative to the guide system when the tailgate frame is in the generally horizontal open position and the movable frame assembly is pivoted upward relative to the tailgate frame.

2. The tailgate assembly of claim 1 wherein the supplemental tailgate further includes a second lock rod assembly telescopically extendable from and pivotable relative to the second end of the cross member, with the second lock rod assembly including a second lock rod bar having a second lock rod latch affixed thereto that is adapted to releasably latch to the other of the pair of side walls to thereby support the movable frame portion relative to the guide system when the tailgate frame is in the generally horizontal open position and the movable frame assembly is pivoted upward relative to the tailgate frame.

3. The tailgate assembly of claim 2 wherein the supplemental tailgate includes a first hollow tube supported by the cross member and a second hollow tube, adjacent to the first hollow tube and supported by the cross member, and with the lock rod bar telescopically receivable within and supported by the first hollow tube and the second lock rod bar telescopically receivable within and supported by the second hollow tube.

4. The tailgate assembly of claim 1 wherein the supplemental tailgate includes a hollow tube supported by the cross member, with the lock rod bar telescopically receivable within and supported by the hollow tube.

5. The tailgate assembly of claim 4 wherein the cross member includes a lock rod release lever that is selectively engagable with the lock rod latch.

6. The tailgate assembly of claim 5 wherein the lock rod latch includes a first release lever that is selectively engagable with the lock rod release lever.

7. The tailgate assembly of claim 1 wherein the lock rod assembly includes a base portion that is retained by the cross member and a pivot hinge that pivotally couples the base portion to the lock rod bar.

8. The tailgate assembly of claim 1 wherein the lock rod latch is adapted to engage a hook support on the one of the pair of side walls and includes a release lever for releasably engaging the lock rod latch to the hook support.

9. The tailgate assembly of claim 1 wherein the guide system includes a pair of spaced guide tubes that each telescopically receive a respective one of the telescoping supports and are fixed to the tailgate frame, and two pivot brackets, each having a pivot slot, with one of each of the pivot brackets mounted on a respective one of the guide tubes; and wherein the movable frame assembly includes two pivot pins, one each secured to a respective one of the telescoping supports, whereby when each of the telescoping supports are essentially fully removed from the respective guide tubes, the pivot pins will engage with the pivot slots to secure each telescoping support to the respective guide tube while allowing the telescoping supports to pivot relative to the guide tubes.

10. The tailgate assembly of claim 1 wherein the motor vehicle is a pickup truck that includes a pair of latch pins, each mounted on a respective one of the pair of side walls, for securing the tailgate assembly to the pair of side walls, and the lock rod latch is adapted to engage one of the pair of latch pins and includes a release lever for releasably engaging the lock rod latch to the one of the pair of latch pins.

11. A supplemental tailgate assembly for use with a vehicle tailgate having a tailgate frame forming a generally hollow cavity therein, said tailgate being pivotally supported from a vehicle cargo box, the supplemental tailgate assembly comprising:

a guide system adapted to be secured generally within the hollow cavity of the tailgate;

a movable frame assembly having two telescoping supports extendable from and retained by the guide system, a cross member connected to the two telescoping supports and extending generally therebetween and including a first end and an opposed second end; and a lock rod assembly having a first lock rod bar that is telescopically extendible from and pivotable relative to the first end of the cross member and includes a first lock rod latch affixed thereto, and a second lock rod bar that is telescopically extendable from and pivotable relative to the second end of the cross member and includes a second lock rod latch affixed thereto, said first and second lock rod latch being connectable to respective support members on said cargo box for support of said supplemental tailgate.

12. The supplemental tailgate assembly of claim 11 further including a first hollow tube supported by the cross member and a second hollow tube, adjacent to the first hollow tube and supported by the cross member, and with the first lock rod bar telescopically receivable within and supported by the first hollow tube and the second lock rod bar telescopically receivable within and supported by the second hollow tube.

13. The supplemental tailgate assembly of claim 12 wherein the lock rod assembly includes a first base portion that is retained by the cross member and a first pivot hinge that pivotally couples the first base portion to the first lock rod bar, and a second base portion that is retained by the cross member and a second pivot hinge that pivotally couples the second base portion to the second lock rod bar.

14. The supplemental tailgate assembly of claim 13 wherein the first lock rod latch includes a first release lever adapted for releasably engaging the lock rod latch to a generally cylindrical support member, and the second lock rod latch includes a second release lever adapted for releasably engaging the second lock rod latch to a second generally cylindrical support member.

15. The supplemental tailgate assembly of claim 11 wherein the lock rod assembly includes a first base portion that is retained by the cross member and a first pivot hinge that pivotally couples the first base portion to the first lock rod bar, and a second base portion that is retained by the cross member and a second pivot hinge that pivotally couples the second base portion to the second lock rod bar.

16. The supplemental tailgate assembly of claim 11 wherein the first lock rod latch includes a first release lever adapted for releasably engaging the lock rod latch to a generally cylindrical support member, and the second lock rod latch includes a second release lever adapted for releasably engaging the second lock rod latch to a second generally cylindrical support member.

17. The supplemental tailgate assembly of claim 11 wherein the guide system includes a pair of spaced guide tubes that each telescopically receive a respective one of the telescoping supports and are adapted to be fixed to the tailgate frame, and two pivot brackets, each having a pivot slot, with one of each of the pivot brackets mounted on a respective one of the guide tubes; and wherein the movable frame assembly includes two pivot pins, one each secured to a respective one of the telescoping supports, whereby when each of the telescoping supports are essentially filly removed from the respective guide tubes, the pivot pins will engage with the pivot slots to secure each telescoping support to the respective guide tube while allowing the telescoping supports to pivot relative to the guide tubes.

18. A pickup truck, having a pair of spaced, generally vertical side walls and a generally horizontal bed extending therebetween, comprising:

a pair of latch pins, one each extending from a respective one of the pair of vertical side walls;

a tailgate assembly having a tailgate frame pivotally mounted generally between the side walls and being operable between a generally vertical closed position and a generally horizontal open position, and with the tailgate frame including a generally hollow cavity therein; and a supplemental tailgate including a guide system having a pair of guide tubes secured generally within the hollow cavity and including two pivot brackets, with each pivot bracket having a pivot slot and being mounted to a respective one of the guide tubes; a movable frame assembly having two telescoping supports, each extendable from and retained by a respective one of the guide tubes, and including two pivot pins, one each secured to a respective one of the telescoping supports, whereby when the telescoping supports are essentially fully removed from the guide tubes, the pivot pins will engage with the pivot slots to secure each telescoping support to the respective guide tube while allowing the telescoping supports to pivot relative to the guide tubes; a cross member connected to the two telescoping supports and extending generally therebetween and including a first end and an opposed second end; and a lock rod assembly telescopically extendable from and pivotable relative to the first end of the cross member, with the lock rod assembly including a lock rod bar having a lock rod latch affixed thereto that is selectively latchable to one of the pair of latch pins to thereby support the movable frame portion relative to the guide system when the tailgate frame is in the generally horizontal open position and the movable frame assembly is pivoted upward relative to the tailgate frame.

19. The pickup truck of claim 18 wherein the supplemental tailgate further includes a second lock rod assembly telescopically extendable from and pivotable relative to the second end of the cross member, with the second lock rod assembly including a second lock rod bar having a second lock rod latch affixed thereto that is selectively latchable to the other of the pair of latch pins to thereby support the movable frame portion relative to the guide system when the tailgate frame is in the generally horizontal open position and the movable frame assembly is pivoted upward relative to the tailgate frame.

20. The pickup truck of claim 18 wherein the supplemental tailgate includes a hollow tube supported by the cross member, with the lock rod assembly bar telescopically receivable within and supported by the hollow tube.

* * * * *